May 6, 1969

S. RIUSECH 3,442,087

SUB-SURFACE IRRIGATION SYSTEM

Filed Aug. 10, 1967

INVENTOR.
SERGIO RIUSECH
BY John Cyril Malloy
ATTORNEY.

United States Patent Office 3,442,087
Patented May 6, 1969

3,442,087
SUB-SURFACE IRRIGATION SYSTEM
Sergio Riusech, 1122 NW. 3rd St.,
Miami, Fla. 33128
Filed Aug. 10, 1967, Ser. No. 659,633
Int. Cl. E02b 13/00
U.S. Cl. 61—13                  4 Claims

ABSTRACT OF THE DISCLOSURE

An improved sub-surface irrigation system which includes a plurality of spaced pipes for distributing water and spaced valves in the pipes, said valves including an exterior foot on the lower surface of the pipe with an upstanding leg to be received within the pipe and including passageways for laterally distributing fluid flow through the pipe which is picked up by a flexible tube within the pipe.

---

This invention relates to sub-surface irrigation. The present invention provides a system including valve means for the distribution of liquids for the purpose of moistening soil and includes the incorporation of substances into the soil by means of the liquid being distributed. In the past, attention has been given to the problem of the distribution of liquids through a system of tubes imbedded in the ground and which includes valves or openings through which liquids may be pumped or allowed to flow to be distributed as small quantities discharged along the length of the tube. The advantages of such an irrigation system are that there is no run-off of the water or evaporation, and, consequently, better crops. Additional advantages are that, as is the case with above ground sprays, pollen is not wasted from the plants which is undesirable for breeding purposes. Additionally, the roots of the plants grow more downwardly toward the moisture and draw more nourishment from the soil which does not form a crust on the surface because of the underlying moisture. Since water does not get on the foliage the plants do not blister in the hot sun and the underground system can be used to fertilize the plants by including liquid fertilizer in the water.

It is an object of this invention to provide an improved irrigation system which includes tubing of plastic material adapted to be positioned in a pattern below the surface of a bed with the tubes having spaced holes and valve members secured in the holes.

It is another object of this invention to provide an improved distribution system of the type set forth in the preceding paragraph wherein the valve members each comprise a foot having a leg adapted to pierce and dwell in the spaced holes along the length of the tube in fluid-tight relation and including a vertical passageway in the leg in communication with a lateral passageway in the foot and a tube length to project into the cross-sectional area of the main tube, said tube length being sized for fluid-tight receipt in the opening in the leg.

It is another object of this invention to provide a system for sub-surface irrigation which is simple and inexpensive to manufacture and adapted for moistening of soil by seepage of water to enable the liquids to be conveyed to the soil under cultivation and which includes a valve which is low in cost, adapted for mass production and easy distribution, installation and operation, and low in maintenance for utilization in the conservation of water and maximum utilization thereof.

In accordance with these and other objects which will become apparent hereinafter, the instant invention will now be described with reference to the accompanying drawings in which.

Figure 1:
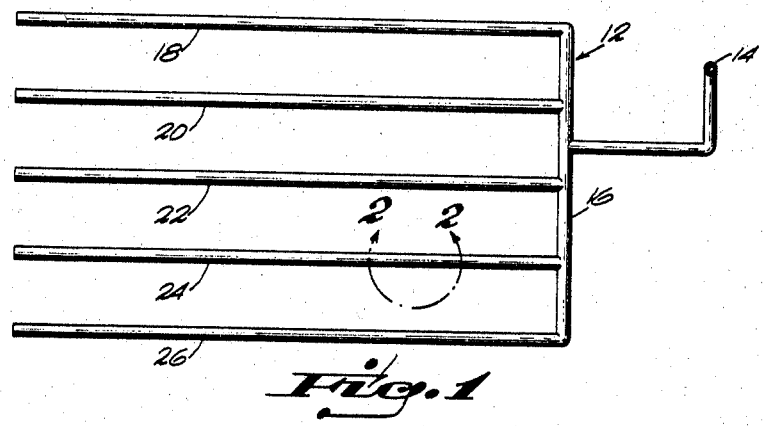
FIGURE 1 is a plan view of an irrigation system as seen from above with the soil removed.
Figure 2:
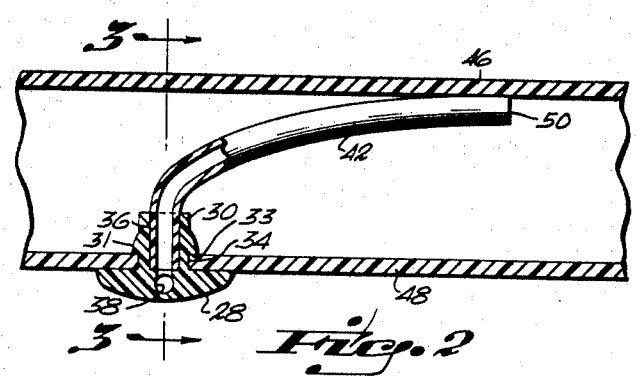
FIGURE 2 is an elevation view in cross section of that area indicated by the arrowed line 2—2 therearound.
Figure 3:
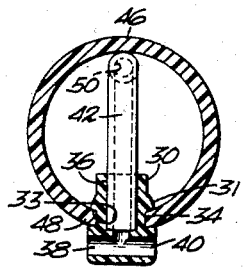
FIGURE 3 is a view in cross section taken along the plane indicated by the line 3—3 of FIGURE 2 and looking in the direction of the arrows.

Referring to the drawings, wherein like reference characters designate like or corresponding parts throughout the different views, and referring particularly to FIGURE 1, it will be seen that the system 12 includes an inlet 14 which through a trunk line 16 leads to a plurality of parts in parallel such as 18, 20, 22, 24 and 26 which are suitably spaced from one another and which is constructed of suitable plastic material and through which liquids may be pumped for seepage into the soil through valve means to be described more fully hereinafter. It is understood that the range of the system is influenced by the size of the pipe employed, the pressure imposed on the liquid, the size and spacing of the valve means. Referring to FIGURE 2, the valve is seen in cross section and includes a foot 28 with an upstanding leg 30 to the terminal end of which an enlarged retaining ring 31 is provided spaced at a distance such that the foot side of the ring defines a shoulder 33 spaced a distance from the foot surface which is substantially the same as the thickness of the wall of the pipe. The valve member foot is inserted through a hole 34 in the wall and is held in position in water-tight relation by reason of the snug fit thereof. The leg is provided with an axial bore 36 extending vertically to open communication with transverse or lateral passageways 38 and 40. A tubular member 42 is provided with one end thereof being sized for snug water-tight receipt with the bore of the leg. The tube is of flexible material and is inserted through the hole in the wall of the tube with the terminal end of the tube facing in the direction that the water will flow through the pipe; that is, in the downstream direction, until the flexible tube hits the roof 46 of the pipe to be deflected in the attitude shown in FIGURE 2 as continued pressure secures the foot in the hole in the floor 48 of the pipe. It will be seen that this provides covered lateral passageways 38 and 40 for water which is picked up by the terminal end 50 of the tube and permits of a favorable distribution of fluids in a flexible, adaptable, low cost irrigation system.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use in a sub-surface distribution system for irrigation,
   a pipe member having a plurality of spaced through holes therealong in the wall, said holes being of a common dimension and arranged in a straight line,
   a valve member in each of said holes, each of said valve members comprising
      a foot on the outside of the wall and circumposed about its associated hole,
      an upstanding leg extending through said associated hole,
      means to secure each of said valves in said associated hole,
      each of said legs having a passageway coaxial with said hole and extending into said foot, each of said feet having lateral passageways extending in a lateral direction only relative to the longitudinal center line of said pipe and each of said legs including a tubular portion having a proximal portion in open communication with the passageway through said leg and with the lateral passageways of its associated foot, and said tubular portion comprising a length of flexible resilient plastic material of a length greater than the diameter of said pipe and all of said tubular portion being arcuate when said valves are in said pipe member extending from their respective associated holes in a common longitudinal direction and terminating in a distal end portion facing longitudinally and engaging the pipe wall in a line diametrically opposed to said straight line and sealing means to secure each of said valve members in said associated hole, each of said feet being of a longitudinal contour as seen in side elevation which merges and blends with the exterior surface of said pipe on the opposite longitudinal surfaces on either side of said lateral passageways.

2. The device as set forth in claim 1 wherein said means to secure and said sealing means include an exterior leg contour of each valve leg provided with an enlarged portion tapering toward the distal end of said leg and spaced from said foot the thickness of said pipe at said hole and said leg is the size of said hole whereby the leg is adapted to be pushed into said hole for snap engagement thereof in fluid-tight relation with said shoulder on one side of said pipe and with said foot on said other side of said pipe.

3. The device as set forth in claim 1 wherein a plurality of said pipe members with a valve in each of the respective holes of said members are arranged in a network for sub-surface distribution of irrigating water.

4. The device as set forth in claim 4 wherein said foot is dome-shaped as seen in elevation.

References Cited

UNITED STATES PATENTS

| | | | |
|---|---|---|---|
| 953,080 | 3/1910 | Wiggins | 61—13 |
| 2,563,300 | 8/1951 | Aker. | |
| 3,036,783 | 5/1962 | Hansen. | |
| 3,292,378 | 12/1966 | Rosenthal et al. | 61—13 |
| 3,302,408 | 2/1967 | Schmid | 61—13 |

EARL J. WITMER, *Primary Examiner.*